UNITED STATES PATENT OFFICE.

OSCAR BALLY, OF MANNHEIM, GERMANY, ASSIGNOR TO BADISCHE ANILIN & SODA FABRIK, OF LUDWIGSHAFEN, GERMANY, A CORPORATION OF GERMANY.

ANTHRACENE DYE AND PROCESS OF MAKING SAME.

SPECIFICATION forming part of Letters Patent No. 707,374, dated August 19, 1902.

Application filed July 2, 1901. Serial No. 66,898. (No specimens.)

*To all whom it may concern:*

Be it known that I, OSCAR BALLY, doctor of philosophy and chemist, a citizen of the Swiss Republic, residing at Mannheim, in the Grand Duchy of Baden, Germany, have invented new and useful Improvements in Coloring-Matter of the Anthracene Series and Process of Producing Same, of which the following is a specification.

It is known that by the action of primary aromatic amins on certain nitro-anthraquinone bodies—such as dinitro-anthraquinone, nitro-anthraquinone sulfo-acid, hydroxy-nitro-anthraquinone, tetra-nitro-anthrachrysone, and the like—products are formed which, if not directly suitable for use as dyestuffs, can be converted into dyestuffs by simple means—for example, by sulfonation. In these cases aromatic amins—that is, basic bodies—are condensed with nitro-anthraquinones, and it is believed that a substitution of alphyl-amido group for nitro group takes place thereby.

I have discovered that the above-mentioned class of nitro-anthraquinone bodies—that is to say, such nitro-anthraquinones and derivatives of nitro-anthraquinones as, on condensation with primary aromatic amins, yield coloring-matters or bodies easily convertible into coloring-matters, as hereinbefore mentioned—can be condensed with the sulfo-acids of primary aromatic amins, compounds which, in most cases, are not of a basic character. The reaction is best carried out in the presence of water, the sulfo-acid dissolved or suspended in water being heated with the desired nitro-anthraquinone body either at the temperature of the water-bath or at a higher temperature and under pressure, as the circumstances may require.

The following examples will serve to further illustrate the nature of my invention and a manner of carrying the same into practical effect; but the invention is not confined to the examples. The parts are by weight.

*Example 1—Production of coloring-matter from 1.8-dinitro-anthraquinone and sodium sulfanilate.*—Mix together in an enameled autoclave one (1) part of 1.8-dinitro-anthraquinone, one (1) part of sodium sulfanilate, (containing water of crystallization,) and five (5) parts of water and heat the mixture for four (4) hours at a temperature of two hundred (200) degrees centigrade. The pressure rises to about twenty-five (25) atmospheres. When cold, dilute the red reaction product with water, filter off any unchanged dinitro-anthra-quinone present, and precipitate the coloring-matter from the filtrate by means of common salt. In place of 1.8-dinitro-anthraquinone another isomeric anthraquinone can be used, or the crude mixture of nitro-anthraquinones obtained by nitrating anthraquinone may be employed in this example.

*Example 2—Production of coloring-matter from mononitro-anthraquinone sulfo-acid and sodium sulfanilate.*—Heat together in an autoclave one (1) part of crude mononitro-anthraquinone monosulfo-acid, (obtainable by nitrating anthraquinone monosulfo-acid,) one (1) part of sodium sulfanilate, (containing water of crystallization,) and twenty-five (25) parts of water for four (4) hours at a temperature of two hundred (200) degrees centigrade. Allow to cool and precipitate the red dyestuff formed by means of common salt.

*Example 3—Production of coloring-matter from mononitro-anthraquinone sulfo-acid and sodium metanilate.*—Heat together in an autoclave one (1) part of crude mononitro-anthraquinone monosulfo-acid, one (1) part of a paste of sodium metanilate, (containing eighty-five per cent. of sodium metanilate,) and five (5) parts of water for five (5) hours at a temperature of two hundred (200) degrees centigrade. Allow to cool and precipitate, by means of potassium chlorid, the coloring-matter from the brown solution obtained.

*Example 4—Production of coloring-matter from dinitro-anthrachrysone disulfo-acid and sodium sulfanilate.*—Heat together on the boiling water-bath one (1) part of dinitro-anthrachrysone disulfo-acid, three (3) parts of sodium sulfanilate, (containing water of crystallization,) and twenty (20) parts of water. The solution is at first brown, but gradually becomes violet, and finally blue. Salt out the coloring-matter, press, and dry.

In the preceding examples sodium metanilate can be substituted for sodium sulfanilate, and vice versa. Other amido sulfo-acids of the benzene series and the naphthalene series can also be employed.

My new coloring-matter thus obtained dyes unmordanted wool and wool mordanted with metallic salts. The dyeings produced on unmordanted wool can be subsequently treated with metallic salts and the shades thereby modified, if desired.

Some of the properties of the new coloring-matter obtainable according to my invention are set forth in the following table:

| Condensation product from— | Water. | Caustic-soda lye. | Sodium carbonate. | Alcohol. | Glacial acetic acid. | Sulfuric acid 96%. | Sulfuric acid 96% with addition of boric acid. | Dyes chrome-mordanted wool. |
|---|---|---|---|---|---|---|---|---|
| 1.8-dinitro-anthraquinone + sulfanilic acid. | Easily soluble; red-violet. | Color not changed. | | Soluble cherry-red. | | Yellow-brown. | On long standing blue. | Violet-red. |
| Crude dinitro-anthraquinone + sulfanilic acid. | ....do.... | ....do.... | | ....do.... | | Olive. | On long standing dull violet. | Dull violet-red. |
| Crude nitro-anthraquinone monosulfo-acid + sulfanilic acid. | Easily soluble; fuchsine red. | Solution somewhat more violet. | | Hardly soluble. | Fairly easily soluble; yellow-red. | Olive. | On long standing claret-red. | Red. |
| Crude nitro-anthraquinone monosulfo-acid + metanilic acid. | Easily soluble; red-brown. | Dull violet. | | Fairly soluble; orange. | | Brown. | On long standing violet-brown. | Reddish-brown. |
| Dinitro-anthrachrysone disulfo-acid + sulfanilic acid. | Easily soluble; violet-blue. | Somewhat redder. | Violet. | Hardly soluble. | | Yellow-brown. | At once green-blue. | Green-blue. |

Now what I claim is—

1. The process of manufacturing coloring-matter of the anthracene series by condensing sulfo-acids of primary aromatic amins with nitro-anthraquinone substances.

2. The process of manufacturing coloring-matter of the anthracene series by condensing sulfanilic acid with nitro-anthraquinone substances.

3. As a new product the coloring-matters of the anthracene series which can be obtained by condensing a sulfo-acid of a primary aromatic amin with a nitro-anthraquinone substance; which are soluble in water with a reddish-brown to violet-blue color; soluble in glacial acetic acid with a reddish to orange color; soluble in concentrated sulfuric acid with a yellow-brown to violet color.

In testimony whereof I have hereunto set my hand in the presence of two subscribing witnesses.

OSCAR BALLY.

Witnesses:
JACOB ADRIAN,
JOHN L. HEINKE.